(12) United States Patent
Duarte et al.

(10) Patent No.: US 7,278,108 B2
(45) Date of Patent: Oct. 2, 2007

(54) SYSTEM AND METHOD OF DISPLAYING MULTIPLE PENDING NOTIFICATIONS IN A SINGLE WINDOW

(75) Inventors: Matias G. Duarte, San Francisco, CA (US); Christopher J. DeSalvo, San Francisco, CA (US)

(73) Assignee: Danger, Inc., Palo Alto, CA (US)

( * ) Notice: Subject to any disclaimer, the term of this patent is extended or adjusted under 35 U.S.C. 154(b) by 405 days.

(21) Appl. No.: 09/927,947

(22) Filed: Aug. 10, 2001

(65) Prior Publication Data

US 2003/0030670 A1   Feb. 13, 2003

(51) Int. Cl.
*G06F 17/00* (2006.01)
(52) U.S. Cl. ............... 715/758; 715/759; 715/750; 715/751; 709/204; 709/206; 709/207
(58) Field of Classification Search ............ 345/764, 345/750–759, 733, 741; 709/204, 205, 206, 709/207, 224; 715/758, 759, 750–753, 733, 715/741
See application file for complete search history.

(56) References Cited

U.S. PATENT DOCUMENTS

| | | | |
|---|---|---|---|
| 5,579,472 A | 11/1996 | Keyworth, II et al. | |
| 5,880,731 A | 3/1999 | Liles et al. | |
| 5,990,887 A | 11/1999 | Redpath | |
| 6,067,539 A * | 5/2000 | Cohen ........................ 707/2 |
| 6,259,449 B1 | 7/2001 | Saxena et al. | |
| 6,333,973 B1 * | 12/2001 | Smith et al. ............. 379/88.12 |
| 6,396,513 B1 * | 5/2002 | Helfman et al. ............ 345/752 |
| 6,677,976 B2 * | 1/2004 | Parker et al. ............. 348/14.08 |
| 6,701,330 B1 * | 3/2004 | Cooper et al. ............. 707/202 |
| 6,725,228 B1 * | 4/2004 | Clark et al. ................. 707/102 |
| 6,731,308 B1 * | 5/2004 | Tang et al. ................. 715/751 |
| 6,871,214 B2 * | 3/2005 | Parsons et al. ............. 709/206 |
| 2001/0013050 A1 | 8/2001 | Shah | |
| 2002/0063735 A1 * | 5/2002 | Tamir et al. ................ 345/745 |
| 2002/0101446 A1 | 8/2002 | Tang et al. | |
| 2002/0120702 A1 * | 8/2002 | Schiavone et al. ......... 709/207 |
| 2002/0130904 A1 * | 9/2002 | Becker et al. .............. 345/753 |
| 2002/0138588 A1 * | 9/2002 | Leeds ......................... 709/217 |
| 2004/0014456 A1 * | 1/2004 | Vnnen ........................ 455/413 |
| 2005/0117733 A1 * | 6/2005 | Widger et al. ......... 379/221.05 |
| 2006/0179415 A1 * | 8/2006 | Cadiz et al. ................ 715/838 |

OTHER PUBLICATIONS

U.S. Appl. No. 60/277,415, filed Mar. 19, 2001.*
Tang et al., "ConNexus: Instant Messaging for the workplace," Sun Microsystems Laboratories Report, Apr. 2000.*

* cited by examiner

*Primary Examiner*—Tadesse Hailu
(74) *Attorney, Agent, or Firm*—Blakely, Sokoloff, Taylor & Zafman, LLP (57) ABSTRACT

A system and method of displaying multiple, concurrent instant messaging (IM) sessions is described. The system and method includes providing multiple IM sessions, displaying a first one of the IM sessions in an IM session window. Representing each one of the IM sessions as a corresponding one of a number of indicators in the IM session window.

22 Claims, 6 Drawing Sheets

SYSTEM AND METHOD OF DISPLAYING MULTIPLE PENDING NOTIFICATIONS IN A SINGLE WINDOW

FIELD OF THE INVENTION

The present invention is related to computer displays and more specifically to the user interface of a computer display.

BACKGROUND OF THE INVENTION

One common user interface is a window such as a pop up window. A very common pop-up window is a message window such as is used in an instant messaging (IM) system such as America On-line's (AOL's) Instant Messenger, Yahoo's Yahoo Messenger, ICQ, Inc's ICQ messaging system, and other similar messaging systems.

Figure 1:
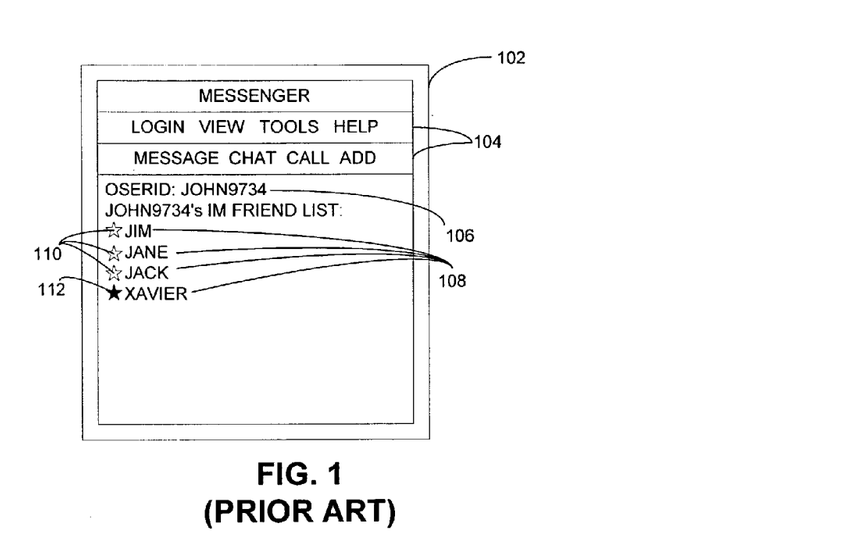
FIG. 1 shows a IM user menu.
Figure 1A:
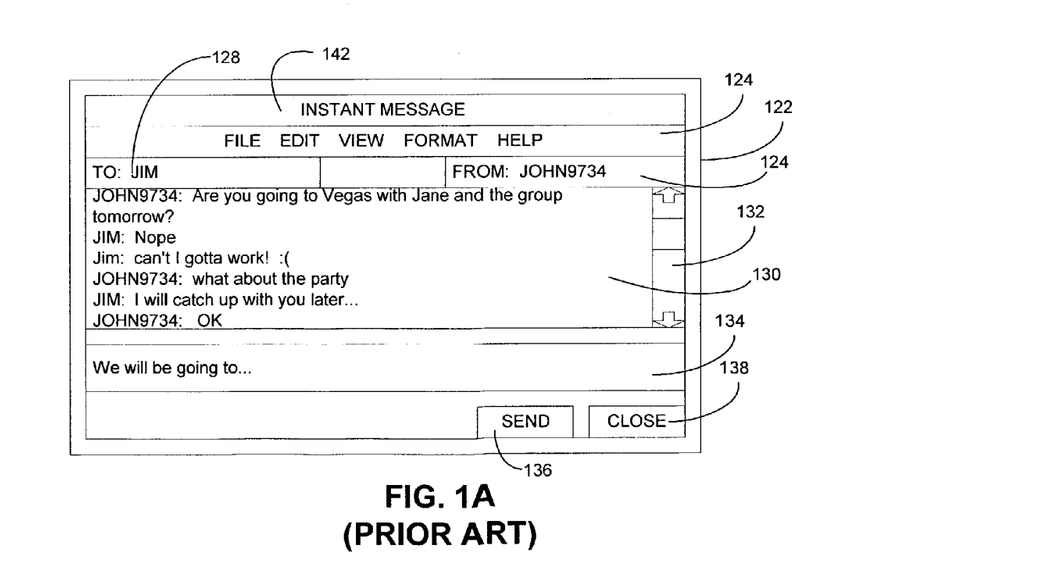
FIG. 1A shows an IM session window.

FIGS. 1-1A illustrate typical IM windows. FIG. 1 shows a IM user menu 102 that includes tool bars 104 for providing the maintenance functions of the IM system such as logging in (LOGIN), MESSAGE to initiate an IM session, and other functions. The user menu also identifies the user 106 and all of the user's friends 108, i.e. the list of other users that the user 106 has set up to converse with via the IM system. Each of the friends 108 typically also has a corresponding indicator 110, 112. The indicators 110, 112 provide an indication that the corresponding user is available to participate in an IM session. For example, the indicators 110 are not highlighted i.e. in an outline mode and therefore indicate friends Jim, Jane, and Jack are not available to participate in an IM session. Conversely, indicator 112 is highlighted i.e. filled in with a bright color to indicate that friend Xavier is available for an IM session.

FIG. 1A shows an IM session window 122. The IM session window includes a tool bar 124, a user ID field 126 to identify the current user, an addressee field 128 that identifies the other user that is participating in the IM session. A conversation window 130 shows the last few lines of the IM session and which user had entered each line. As the lines of the IM session exceed the number of lines that can be shown in the conversation window 130, then a scroll bar 132 is provided to scroll up and down through the lines of the IM session. The conversation window 130 is typically visible to both the user 126 and the addressee 128. A composition field 134 is provided for the user to compose his IM session lines i.e. a comment or reply that will be posted to the conversation window 130 when the user selects the send button 136. A close button 138 is also provided for the user 126 to end the IM session.

Figure 2:
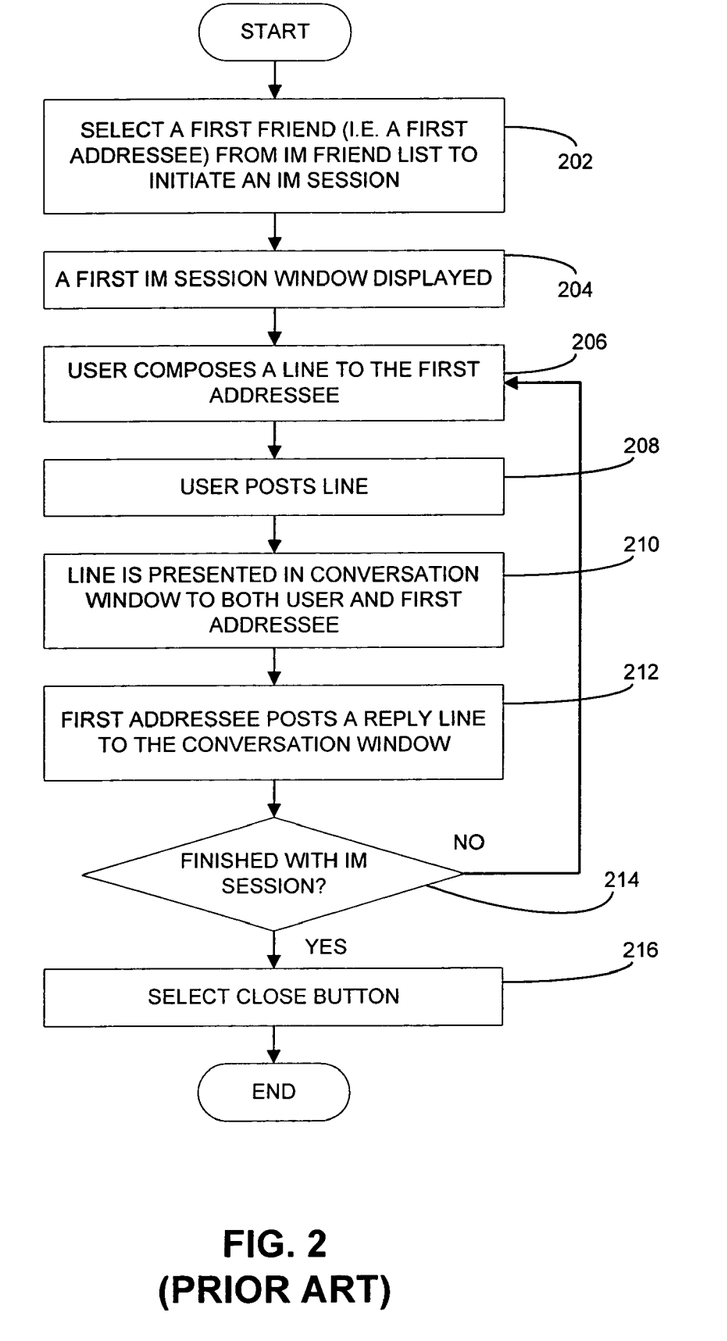
FIG. 2 shows the process of an IM session.

FIG. 2 shows the process of an IM session. At block 202, the user selects a first friend (i.e. a first addressee) from the IM friend list to initiate an IM session. Next, in block 204, a first IM session window is displayed. The user then composes a line to the first addressee in block 206. The user then posts the line and the line appears in the conversation window in blocks 208, 210. Both the user and the addressee can view the conversation window. The first addressee posts a reply to the line from the user in the conversation window in block 212. When the first addressee posts a reply, an indication such as the border 140 or the IM banner 142, from FIG. 1A, "flashes" or alternates changes in color or in a similar manner draws the user's attention to the first IM session window 122 because a new comment has been posted by the other participant, i.e. the first addressee, has posted a new comment or reply to the IM conversation window 130. If the user is finished with the IM session in block 214, then the user selects the close button to end the IM session. If the user does not want to end the IM session in block 214, then the process repeats beginning at block 206.

If the user desires to have more than one IM session concurrently. i.e. simultaneously, so that the user can have two or more separate IM conversations with a different addressee in each IM session, then the user simply performs the process of FIG. 2 multiple times, in parallel. The user can thereby have multiple concurrent IM session windows.

A user may often desire to have multiple IM sessions concurrently. When the user is using a PC or other computing device with a large display, each one of the IM session windows can be displayed in whole or tiled i.e. partially covered by one or more other windows. In this way, as a reply is received in each of the IM sessions, at least a portion of the IM session window that received the reply is visible so that the user can see a portion of the flashing IM session window.

Compact computing devices such as computer with a compact display i.e. a personal digital assistant (PDA), a palm-top computer, a two way pager, an IM session enabled telephone, or other compact computing devices with compact displays are becoming very popular devices for IM. However, because a compact computing device has a compact display, it is often difficult for a user to simultaneously view multiple IM session windows and to easily switch between the multiple IM session windows.

SUMMARY OF THE INVENTION

A system and method of displaying multiple, concurrent instant messaging (IM) sessions is described. The system and method includes providing multiple IM sessions, displaying a first one of the IM sessions in an IM session window. Representing each one of the IM sessions as a corresponding one of a number of indicators in the IM session window.

BRIEF DESCRIPTION OF THE DRAWINGS

The present invention is illustrated by way of example and not limitation in the figures of the accompanying drawings in which like references indicate similar elements.

DETAILED DESCRIPTION

A system and method of conducting an instant messaging (IM) session is described. As will be described in more detail below, on embodiment provides an improved method of managing multiple concurrent IM sessions. The described systems and methods of managing multiple concurrent IM sessions are especially useful when participating in multiple, concurrent IM sessions from a compact computing device that has a limited display capability.

Figure 3:
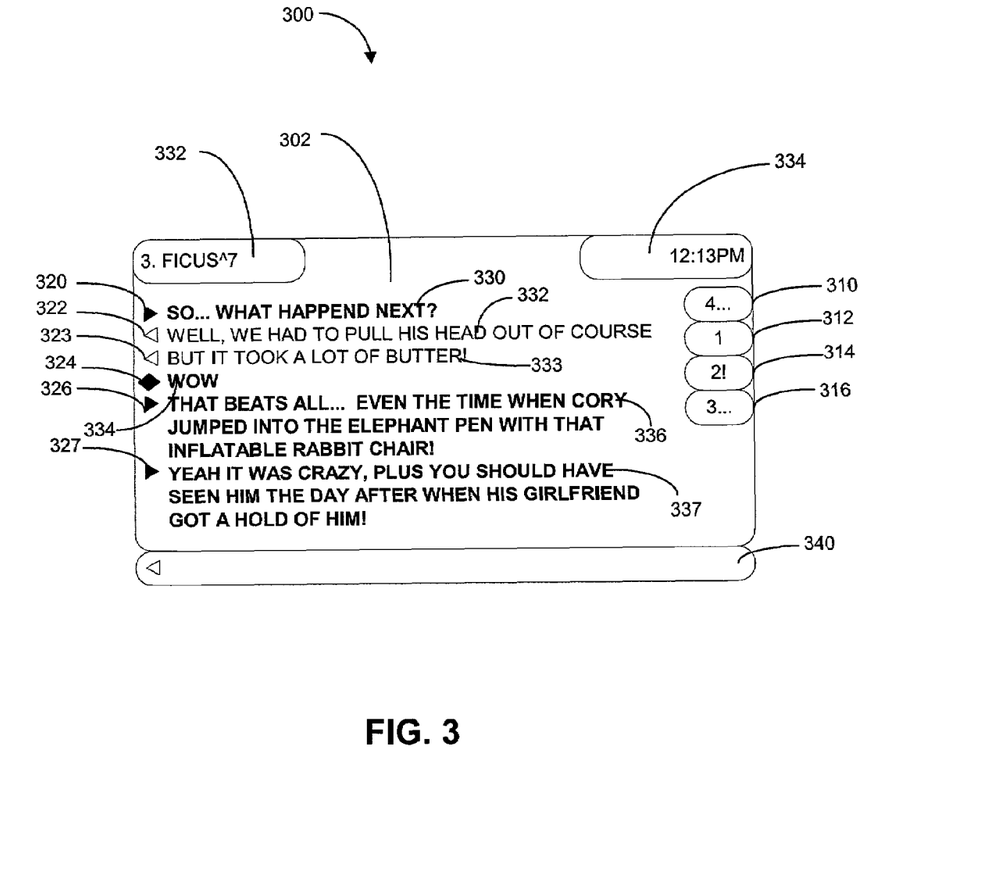
FIG. 3 illustrates one embodiment of an IM session window.

FIG. 3 illustrates one embodiment of an IM session window 300. The IM session window includes a conversation window. The conversation window 302 shows the messages that have been sent and received by the user, in the order that they were sent or received by the user. The IM session window 300 also includes multiple indicators 310, 312, 314, 316. Each of the indicators 310, 312, 314, 316 corresponds to a different IM session. As shown in FIG. 3, the user is involved in four, concurrent IM sessions. One of the concurrent IM sessions, i.e. IM session 3, is shown in the conversation window 302. IM session 3 also corresponds with indicator 316 and field 332 shows the IM session 3 is between the user and an second IM session participant "Ficus^7".

In one embodiment, each of the indicators 310, 312, 314, 316 also include IM session data regarding the corresponding IM session. For example, indicator 310 identifies the corresponding IM session as IM session number 4 and the three periods " . . . " indicates that three messages have been received since the user last viewed IM session number 4. Similarly, indicator 314 identifies the corresponding IM session as IM session number 2. The exclamation mark has been included in indicator 314 to indicate that there have been more than a predetermined number of messages received in IM session number 2 since the user last viewed IM session number 2. The predetermined number can be user selected or automatically selected based on the space available to display the indications, i.e. the periods. For example, the indicators 310, 312, 314, 316 are relatively small so as to not consume unnecessarily large amounts of space on the IM session window 300.

Similar to indicator 314, indicator 312 identifies the corresponding IM session as IM session number 1. Since no additional symbols such as a period or an exclamation mark has been included in indicator 312, then there have been no additional messages received in IM session number 1 since the user last viewed IM session number 1. Similarly, IM session number 3 is identified by indicator 316. Indicator 316 also includes three periods " . . . ". The three periods indicate that three messages, i.e. messages 334, 336, 337 as shown, have been received since the user last viewed IM session number 3.

In an alternative embodiment, when an IM session has no pending i.e. no unread messages received since the user last viewed the IM session, such as IM session 1 represented by indicator 312 above, then the IM session is not represented by a corresponding indicator in the IM session window.

As described above the periods and exclamation marks as used above are only examples of possible symbols and are not intended to limit the scope of the embodiment. Other symbols could be used to indicate the data points described above and additional data points for each corresponding IM session such as an indication of the originator of the message such as a color or symbol. The urgency and/or size of a message could also be indicated. A file attachment and/or file attachment type could also be indicated. For example, if a pending message included a file attachment of a graphic format such as a JPEG file, then a specific symbol corresponding to the JPEG is included in the indicator corresponding to the IM session that received the file attachment.

In another embodiment, the indicators 310, 312, 314, 316 can also be presented in a prioritized order. For example, as shown, indicator 310 is presented on top of the list of indicators 310, 312, 314, 316 and that could be used to indicate that the last message received in the corresponding IM session 4 was received more recently than any other messages in any of the other IM sessions. In this way the user can very quickly see the status of each of the multiple concurrent IM sessions. In one embodiment, as shown in FIG. 3, the currently viewed IM session, IM session 3, has the lowest priority. Alternatively, the currently viewed IM session could have the highest priority. Alternatively, the multiple IM sessions could also be prioritized in order of other activities in addition to receiving messages such as sending a message, displaying the IM session or other activities in the IM sessions such as a number of messages so that the IM session which the user has not participated in the longest is at the top. In another alternative, the priority of represented IM session can be determined by the status of a participant in the represented IM session. For example, if the other participant sets his status as "out to lunch" or "be right back" or "away from my desk", then the priority of the represented IM session is automatically reduced.

In one embodiment, a user can switch between IM sessions quickly and easily by selecting a hotkey. In one embodiment the hotkey is simply the number of the IM session, i.e. to switch from IM session 3 shown in FIG. 3, to IM session 4, the user need only select a hotkey and the number "3" key. In an alternative embodiment a single hotkey can automatically switch from the currently displayed IM session to the IM session having the highest priority. In yet another embodiment, the hotkey can allow the user to "page through" each of the multiple concurrent IM sessions. For example, IM session 3 is currently displayed in the conversation window 302. Pressing the hotkey once could cause IM session 4 to be displayed in the conversation window 302. Similarly, pressing the hotkey a second time could cause IM session 1 to be displayed and so forth to IM sessions 2, 3, 4, 1, etc.

In another embodiment, the hotkey can page through each of the multiple concurrent IM sessions in order of the displayed priority i.e. IM session 4, then IM session 1, then IM session 2 and finally IM session 3 again. In one embodiment, the hotkey is a specially designated key. Alternatively, the hotkey can be a user assigned key through the software of the system displaying the IM session.

In yet another embodiment, the user can select another IM session to display by selecting the corresponding indicator 310, 312, 314, 316 with a pointing device such as a mouse or similar pointing devices that are well known in the art. Similarly, if the conversation window is presented on a touch sensitive display, then a user could select the new IM session to display by touching the screen over the corresponding indicator 310, 312, 314, 316.

In one embodiment, the number of IM sessions that can be represented as one of the corresponding indicators 310, 312, 314, 316 is limited to a predetermined number such as a number that can be easily managed on the given display or IM session window 300 size. Alternatively, no limits may be placed on the number of IM sessions that can be represented as one of the corresponding indicators 310, 312, 314, 316, however, the number of indicators 310, 312, 314, 316 that may be displayed in the IM session window 300 may be limited. In such an embodiment the user may be able to scroll through the list of indicators 310, 312, 314, 316. In one embodiment, the scrolling list of indicators is endless, i.e. when the user scrolls "downward" to the "last" indicator in the list, scrolling further returns to the first indicator so that the user scrolls in repeating order, indicators 310, 312, 314, 316 and again to indicator 310, 312, 314, 316 and so forth. Alternatively, the highest priority IM sessions could be automatically moved to the top of the displayed list, in order of priority so that the highest priority IM sessions are displayed in the IM session window 300.

In one embodiment, the conversation window 302 includes a variety of symbols 320, 322, 323, 324, 326, 327 as part of the respective messages 330, 332, 333, 334, 336, 337. Each of the symbols 320, 322, 323, 324, 326, 327 indicates information about the corresponding message 330, 332, 333, 334, 336, 337. For example, symbols 320, 326, 327 are arrows pointing toward the conversation window 302 and thereby indicate that the corresponding messages 330, 336, 337 were received in the conversation window 302. Conversely, symbols 322, 323 are arrows pointing out of the conversation window 302, and thereby indicate that the corresponding messages 332, 333 were sent by the user to the other participants in the IM session.

Symbol 324 indicates a first line of messages received since the user last viewed the IM session 3. Symbol 324 allows a user to quickly identify where he left the conversation and what to read and/or respond to. Messages 334, 336, 337 are shown in bold typeface to indicate that the messages 334, 336, 337 were received by the other participants of the IM sessions.

As described above the symbols 320, 322, 323, 324, 326, 327 as used above are only examples of possible symbols and are not intended to limit the scope of the embodiment. Other symbols could be used to indicate the data points described above and additional data points for each corresponding message such as symbols that indicate current state of a user, i.e. emotional indicators that indicate: happy, sad, etc or a proximity indicator that indicates the other user in the IM session is in the same locale i.e. city, state, country or in a mobile environment in the same cellular telephone cell, etc. In yet another embodiment, information about the location of one or all users in IM session. User identity information can also be included. For example if a user is an individual or the representative of a company or an automated reply system, etc.

In various alternative embodiments, the IM session window can also include a user ID field 332 that identifies the user's identification. The IM session can also include a date and/or time field 334. The IM session can also include a message entry field 336.

Figure 4:
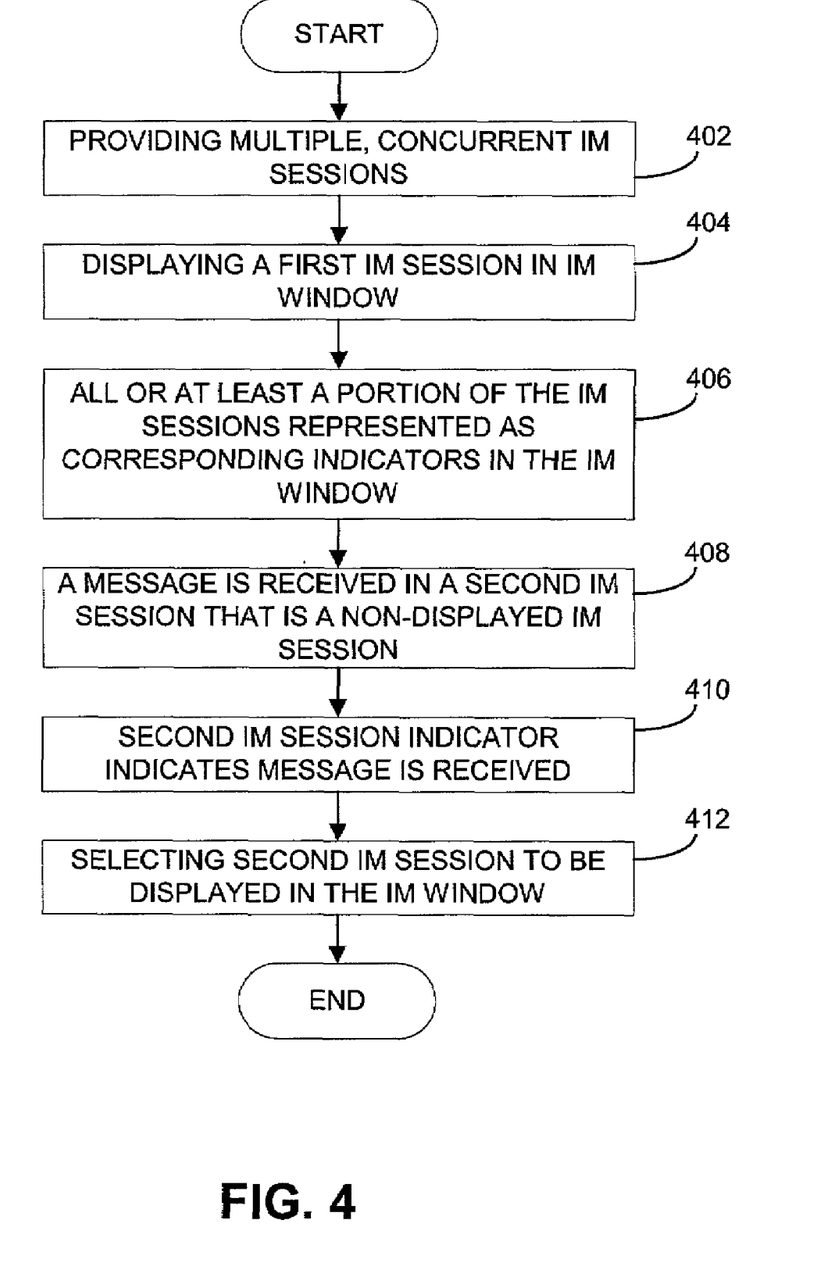
FIG. 4 illustrates a process flow chart of one embodiment of managing multiple, concurrent IM sessions.

FIG. 4 illustrates a process flow chart of one embodiment. First, multiple concurrent IM sessions are provided in block 402. A first IM session is displayed in block 404. All or at least a portion of the IM sessions are represented in the IM session window as corresponding indicators in block 406. When a message is received in one of the non-displayed IM sessions, the corresponding indicator for the non-displayed IM session indicates that the message was received in blocks 408, 410. An non-displayed IM session can also be selected to be displayed in block 412.

It will be further appreciated that the instructions represented by the blocks in FIG. 4 are not required to be performed in the order illustrated, and that all the processing represented by the blocks may not be necessary to practice the invention.

Figure 5:
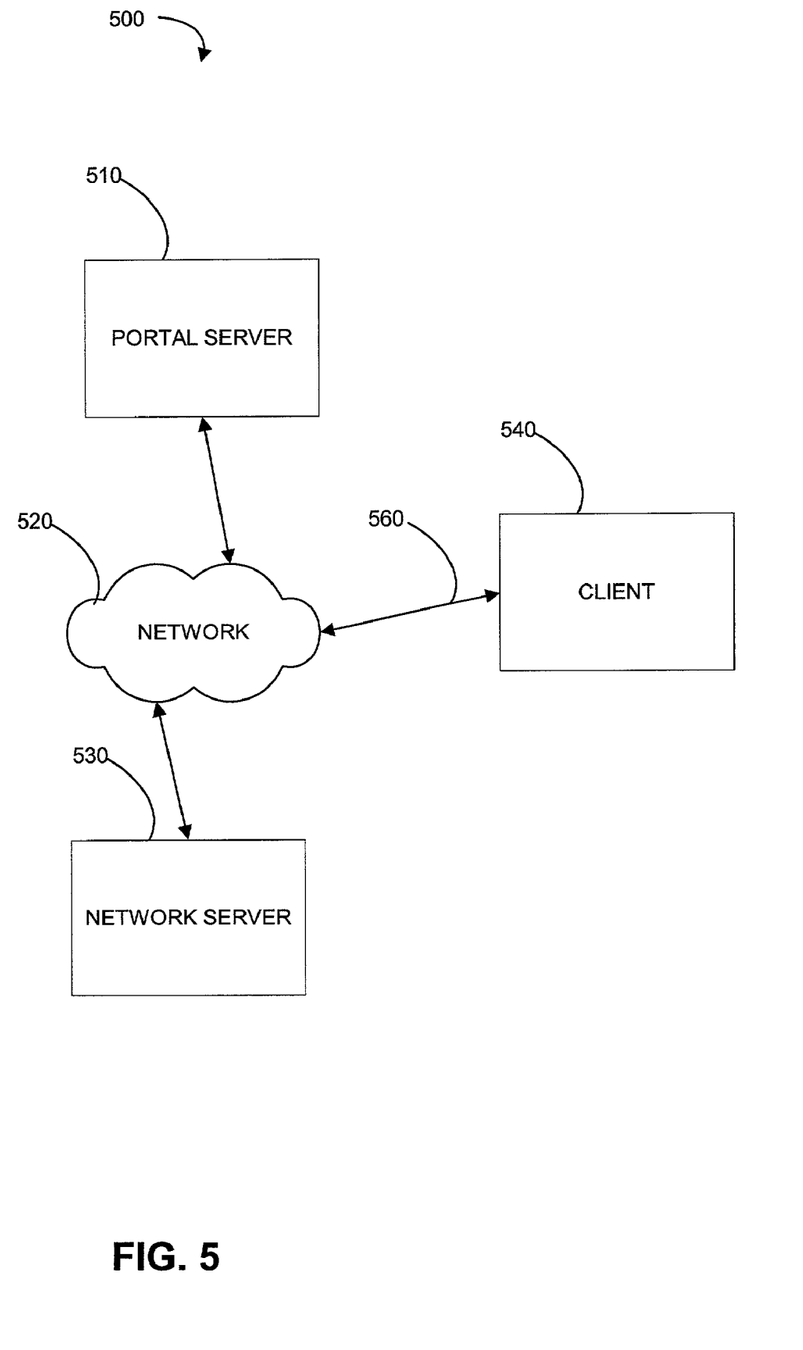
FIG. 5 illustrates one embodiment of a client-server architecture.

Elements of the present invention may be included within a client-server based architecture 500 such as that illustrated in FIG. 5. According to the embodiment depicted in FIG. 5, a portal server 510 communicates with clients 540 i.e. user terminals, and other network servers 530 over a network 520 (e.g., the Internet). The network 520 over which the clients 540 and servers 510, 530 transmit and receive data may be comprised of any combination of private (e.g., leased) and/or public communication channels. These may include, for example, Digital Signal ("DS") channels (e.g., DS-3/T-3, DS-1/T1), Synchronous Optical Network ("SONET") channels (e.g., OC-3/STS-3), Integrated Services Digital Network ("ISDN") channels, Digital Subscriber Line ("DSL") channels, cable modem channels and a variety of wireless communication channels including satellite broadcast and cellular channels.

In addition, various networking protocols may be used to support communication across the network 520 including, for example, the Asynchronous Transfer Mode ("ATM"), Ethernet, and Token Ring (at the data-link level); as well as Transmission Control Protocol/Internet Protocol ("TCP/IP"), Internetwork Packet Exchange ("IPX"), AppleTalk and DECnet (at the network/transport level). It should be noted, however, that the principles of the invention are not limited to any particular communication channel or protocol.

The portal server 510 in one embodiment includes a user database for storing various types of user configuration and account data. Users may register and login to the portal server 510 from a client 540 by specifying a user ID and/or password. According to one embodiment, a user connects to the servers 510, 530 via a browser application such as Netscape Navigator™ or Microsoft Internet Explorer™ which communicates via the Hypertext Transfer Protocol (hereinafter "HTTP").

In one embodiment, users may configure the portal server 510 to retrieve and manage specific types of information. For example, a user may configure the portal server 510 to retrieve up-to-date stock quotes for a specified set of stocks (e.g., reflecting the user's portfolio), to collect the weather forecast for the user's hometown, and/or to retrieve recent articles relating to a particular sports franchise. The portal server will then retrieve the specified information from other servers (e.g., server 530) on behalf of the user.

In addition to information retrieval and management, in one embodiment the portal server 510 also provides application services such as email, online scheduling (e.g., appointments, to-do lists, etc), instant messaging, contact management, word processing and a variety of other online services. Users may access these services by logging in to the portal server 510 with a valid user ID and password. In one embodiment, the portal server 510 generates a unique, personalized Web page for each user containing links to all, or a subset of, the information and/or services subscribed to by the user.

Figure 6:
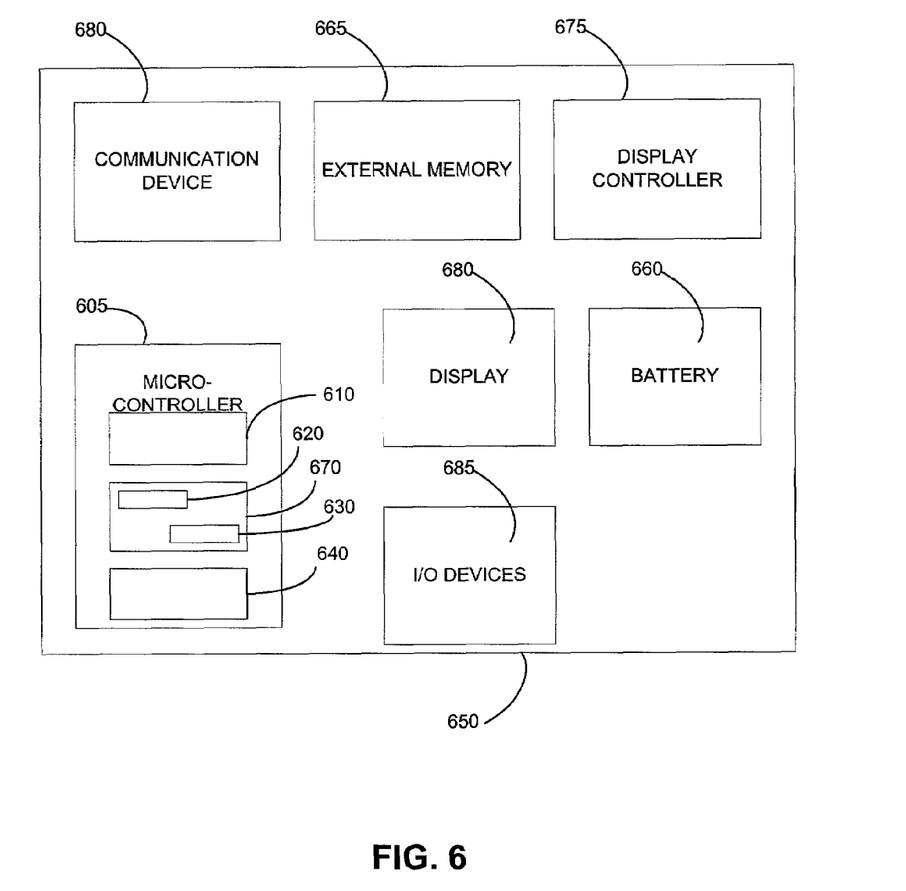
FIG. 6 illustrates one embodiment of a mobile user terminal.

As illustrated in FIG. 6, one embodiment of the mobile user terminal 650 is comprised generally of a microcontroller 605, an external memory 665, a display controller 675, a display 680, one or more input/output devices 685, and a battery 660. The external memory 650 may be used to store programs and/or portal data 665 transmitted to the user terminal 650 from the portal server 610 (e.g., via client 540). In one embodiment, the external memory 665 is non-volatile memory (e.g., an electrically erasable programmable read only memory ("EEPROM"); a programmable read only memory ("PROM"), etc). Alternatively, the memory 665 may be a volatile memory (e.g., random access memory or "RAM") but the data stored therein may be continually maintained via the battery 660. The battery 660 in one embodiment is a coin cell battery (e.g., of the same type used in portable electronic devices such as calculators and watches). In one embodiment, when the battery power decreases below a threshold level, the user terminal 650 will notify the user and/or the portal server 510. The portal server 510 in one embodiment will then automatically send the user a new battery.

The microcontroller 605 of one embodiment is comprised of a central processing unit ("CPU") 610, a read only memory ("ROM") 670, and a scratchpad RAM 640. The ROM 670 is further comprised of an interpreter module 620 and a toolbox module 630.

The toolbox module 630 of the ROM 670 contains a set of toolbox routines for processing data, text and graphics on the user terminal 650. These routines include drawing text and graphics on the user terminal's display 630, decompressing data transmitted from the portal server 610, reproducing audio on the user terminal 650, and performing various input/output and communication functions (e.g., transmitting/receiving data over the client link 560). A variety of additional user terminal functions may be included within the toolbox 630 while still complying with the underlying principles of the invention.

In one embodiment, microprograms and portal data 660 are transmitted from the portal server 510 to the external memory 665 of the user terminal via a communication interface 680 under control of the CPU 610. Various communication interfaces 680 may be employed without departing from the underlying principles of the invention including, for example, a Universal Serial Bus ("USB") interface or a serial communication ("serial") interface. The microprograms in one embodiment are comprised of compact, interpreted instructions known as "bytecodes," which are converted into native code by the interpreter module 620 before being executed by the CPU 610. One of the benefits of this configuration is that when the microcontroller/CPU portion of the user terminal 650 is upgraded (e.g., to a faster and/or less expensive model), only the interpreter module 620 and toolbox 630 of the ROM needs to be rewritten to interpret the currently existing bytecodes for the new microcontroller/CPU. In addition, this configuration allows user terminals 650 with different CPUs to coexist and execute the same microprograms. Moreover, programming frequently-used routines in the ROM toolbox module 630 reduces the size of microprograms stored in the external memory 665, thereby conserving memory and bandwidth over the client link 560. In one embodiment, new interpreter modules 620 and/or toolbox routines 630 may be developed to execute the same microprograms on cellular phones, personal information managers ("PIMs"), or any other device with a CPU and memory.

One embodiment of the ROM 670 may be comprised of interpreted code as well as native code written specifically for the microcontroller CPU 605. More particularly, some toolbox routines may be written as interpreted code (as indicated by the arrow between the toolbox 630 and the interpreter module 620) to conserve memory and bandwidth for the same reasons described above with respect to microprograms. Moreover, in one embodiment, data and microprograms stored in external memory 665 may be configured to override older versions of data/microprograms stored in the ROM 670 (e.g., in the ROM toolbox 630).

As mentioned above, the user terminal 650 may communicate with the portal server 510 using various RF communication techniques. For example, in one particular embodiment, the user terminal 650 transmits and receives data to/from a cellular network via the cellular digital packet data ("CDPD") standard. As it is known in the art, the CDPD standard is a digital wireless standard that is deployed as an enhancement to the existing analog cellular network. It provides a packet overlay onto the AMPS network and moves data at 19.2 Kbps over continuously-changing unused intervals in standard voice channels. Accordingly, this embodiment of the user terminal is capable of exploiting normally unused bandwidth on a nation-wide, analog cellular network. Embodiments of the user terminal may also be configured to transmit/receive data using a variety of other communication standards including 2-way paging standards and third generation ("3G") wireless standards (e.g., UTMS, CDMA 2000, NTT DoCoMo, . . . etc).

The display 680 is included so that a user may view the information processed in the user terminal 650. the input/output devices 685 provide, among other functions, the ability for a user to input and interact with the data. The input output devices 685 includes such items as a mouse, keyboard, touch-sensitive display, and other similar input output devices as are well known in the art.

As indicated in FIG. 6, one embodiment of the user terminal, the CPU 605 employs a 32-bit RISC-based microprocessor such as an ARM processor. As is known in the art, ARM processors are widely used in PDAs, cell phones and a variety of other wireless devices. It should be noted, however, that various other hardware and software (and/or firmware) architectures may be used for the user terminal 650 while still complying with the underlying principles of the invention.

One skilled in the art will immediately appreciate that the invention can be practiced with other computer system configurations, including multiprocessor systems, minicomputers, mainframe computers, and the like. The invention can also be practiced in distributed computing environments where tasks are performed by remote processing devices that are linked through a communications network.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the invention. It will be apparent, however, to one skilled in the art that the invention may be practiced without some of these specific details. For example, while the system described above employs a single portal server 510, alternative embodiments of the invention may include numerous different servers (e.g., database servers, web servers, etc), and/or mirrored servers distributed across a network. Moreover, while the embodiments described above focus on a user terminal which executes interpreted code (e.g., Java bytecodes), the principles of the invention may also be implemented on devices which execute non-interpreted code. Accordingly, the scope and spirit of the invention should be judged in terms of the claims which follow.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method of displaying a plurality of concurrent IM sessions:
   providing a graphical interface to display information related to a plurality of IM sessions, wherein each IM session in the plurality of IM sessions is with a different session than the sessions of the other IM sessions in the plurality of IM sessions;
   displaying a first one of the plurality of IM sessions in a single IM session window;
   representing each one of the plurality of IM sessions as a corresponding one of a plurality of indicators in the single IM session window;
   receiving a plurality of messages in one or more of the plurality of IM sessions;
   indicating the number of messages received in one or more of the plurality of IM sessions in the respective indicators in the single IM session window which corresponds to the one or more of the plurality of IM sessions in response to receiving the plurality of messages, wherein indicating the number of messages comprises displaying a number of first symbols within each of the indicators corresponding to the number of messages; and
   upon reaching a number of messages equal to a specified threshold, displaying a second symbol to indicate that the numbers of messages are above the threshold.

2. The method of claim 1 further comprising:
   initiating a plurality of IM sessions.

3. The method of claim 1, wherein representing each one of the plurality of IM sessions as a corresponding one of the plurality of indicators in the single IM session window includes representing each one the non-displayed ones of the plurality of IM sessions as a corresponding one of the plurality of indicators in the single IM session window.

4. The method of claim 1, further comprising:
   providing a second symbol indicating a beginning of a received message that is displayed in the single IM session window.

5. The method of claim 1, further comprising:
   providing a third symbol indicating a beginning of a sent message that is displayed in the single IM session window.

6. The method of claim 1 further comprising:
   receiving a message in a selected one of the plurality of IM sessions;
   adding the message to the number of previously-received messages in the IM session; and
   updating the number of messages received in each of the indicators which corresponds to the one or more of the plurality of IM sessions.

7. The method of claim 1, further comprising:
   displaying a second one of the plurality of IM sessions, wherein the second session is one of the plurality of IM sessions that was not displayed.

8. The method of claim 7, further comprising representing the first one of the plurality of IM sessions only as a corresponding one of the plurality of indicators in the single IM session window.

9. The method of claim 7, further comprising representing the first one of the plurality of IM sessions as a corresponding one of the plurality of indicators in the single IM session window.

10. The method of claim 7, wherein displaying a second one of the plurality of IM sessions includes:
    selecting a hot key.

11. The method of claim 10, wherein selecting a hot key includes:
    selecting a numbered key that corresponds to a number assigned to the corresponding one of the plurality of indicators in the single IM session window.

12. The method of claim 7, wherein displaying a second one of the plurality of IM sessions includes:
    selecting the indicator that corresponds to the second one of the plurality of IM sessions.

13. The method of claim 1, further comprising prioritizing each one of the plurality of indicators.

14. The method of claim 13, wherein the prioritizing each one of the plurality of indicators includes:
    prioritizing each one of the plurality of indicators in order of activity of the IM session that corresponds to each one of the plurality of indicators.

15. The method of claim 14, wherein the activity of the IM session includes at least one of a group consisting of:
    receiving a message in the IM session;
    sending a message in the IM session;
    displaying the IM session.

16. The method of claim 13, wherein the prioritizing each one of the plurality of indicators includes:
    assigning the displayed IM session a lowest priority.

17. The method of claim 13, wherein the prioritizing each one of the plurality of indicators includes:
    assigning the displayed IM session a highest priority.

18. An instant messaging (IM) session graphical user interface for concurrently managing a plurality of IM sessions comprising:
    a single IM session window to display text associated with a first one of the plurality of IM sessions, wherein each IM session in the plurality of IM sessions is with a different session than the sessions of the other IM sessions in the plurality of IM sessions; and
    a plurality of indicators, displayed in the single IM session window, representing each one of the other plurality of IM sessions, wherein in response to receiving a plurality of messages in one or more of the other plurality of IM sessions, the plurality of indicators in the single IM session window indicate the number of messages received in one or more of the respective IM sessions of the plurality of IM sessions which correspond to the one or more of the plurality of IM sessions, wherein indicatino the number of messages comprises displavinq a number of first symbols within each of the indicators corresponding to the number of messages; and
    upon reaching a number of messages equal to a specified threshold, displaying a second symbol to indicate that the numbers of messages are above the threshold.

19. A system for instant messaging comprising:
    a processor;
    a display coupled to the processor;
    a network coupled to the processor;
    a memory coupled to the processor, wherein the memory includes instruction that when executed by the processor cause the processor to:
       provide a graphical interface to display information related to a plurality of IM sessions, wherein each IM session in the plurality of IM sessions is with a different session than the sessions of the other IM sessions in the plurality of IM sessions;
       display a first one of the plurality of IM sessions in a single IM session window;
       represent each one of the plurality of IM sessions as a corresponding one of a plurality of indicators in the single IM session window;

receive a plurality of messages in one or more of the plurality of IM sessions; and indicate the number of messages received in one or more of the plurality of IM sessions in the respective indicators in the single IM session window which corresponds to the one or more of the plurality of IM sessions in response to receiving the plurality of messages, wherein indicating the number of messages comprises displaying a number of first symbols within each of the indicators corresponding to the number of messages; and upon reaching a number of messages egual to a specified threshold, displaying a second symbol to indicate that the numbers of messages are above the threshold.

20. The system of claim 19, wherein the processor is coupled to the network via a wireless network.

21. The system of claim 19 further comprising a mobile user terminal, wherein the processor and the display are included in the mobile user terminal.

22. A machine-readable medium having program code stored thereon which, when executed by a machine, cause the machine to perform the operations of:

providing a graphical interface to display information related to a plurality of IM sessions, wherein each IM session in the plurality of IM sessions is with a different session than the sessions of the other IM sessions in the plurality of IM sessions;

displaying a first one of the plurality of IM sessions in a single IM session window;

representing each one of the plurality of IM sessions as a corresponding one of a plurality of indicators in the single IM session window;

receiving a plurality of messages in one or more of the plurality of IM sessions; and indicating the number of messages received from one or more of the plurality of IM sessions in the respective indicators in the single IM session window which corresponds to the one or more of the plurality of IM sessions in response to receiving the plurality of messages, wherein indicating the number of messages comprises displaying a number of first symbols within each of the indicators corresponding to the number of messages; and upon reaching a number of messages equal to a specified threshold, displaying a second symbol to indicate that the numbers of messages are above the threshold.

* * * * *